Patented Aug. 17, 1943

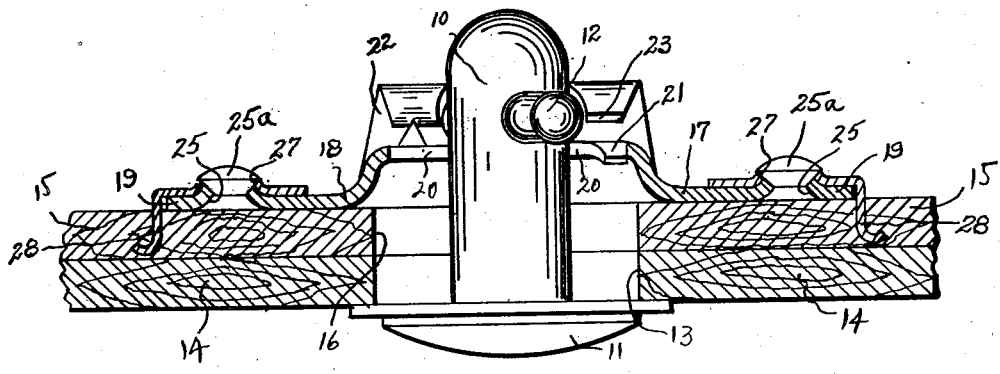
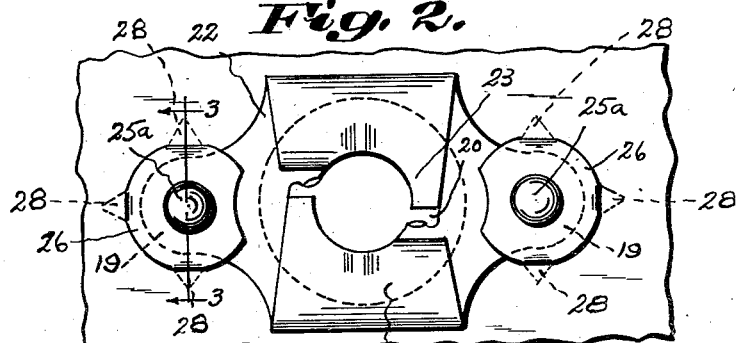
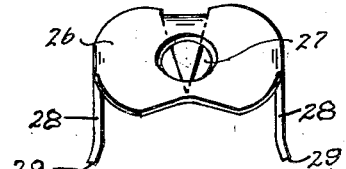
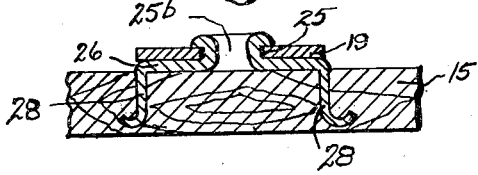
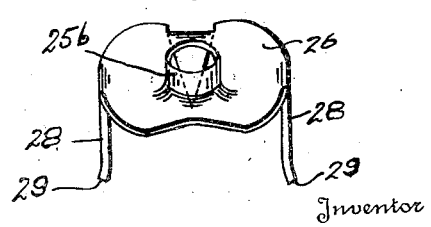

2,327,330

UNITED STATES PATENT OFFICE 2,327,330

ATTACHING MEANS FOR SEPARABLE FASTENER INSTALLATIONS

Thomas Newbold, Santa Clara, N. Y., assignor to United-Carr Fastener Corporation, Cambridge, Mass., a corporation of Massachusetts Application October 23, 1942, Serial No. 463,026

8 Claims. (Cl. 24—221)

The present invention relates particularly, though not exclusively, to rotary stud fastener installations of the type employing a rotary stud member formed with a lateral projection, as for example a radial pin, and mounted in a part to be secured to a support which stud member is designed upon partial rotation, to interlock with a socket member attached to the support.

Fasteners of the above described type are extensively used in the airplane industry to secure airplane cowling and like sheets to their supports. In the manufacture of certain types of planes the sheets or parts to be secured to the support are of non-metallic material such as fiber board or plywood and are substantially softer than metal sheets. Difficulty has been experienced in securely attaching the fastener parts to such softer non-metallic parts, as the usual rivets and like fastenings used in connection with metallic parts tend to pull through the softer material of the non-metallic parts.

The operative parts of the fastener are subjected to an unusually high degree of work when in use and such fasteners for airplane use are required to withstand a test of approximately 40,000 turns without rupture before being acceptable. In order to adequately withstand such a test, one or both of the fastener parts is advantageously heat-treated.

The present invention aims to improve the means for mounting and attaching the socket member of the fastening to the non-metallic support.

Illustrative of the invention reference is made to the accompanying drawing, in which Fig. 1 is a vertical sectional view of a rotary stud fastener installation according to the invention;

Fig. 2 is a plan view thereof as viewed from the outer face of the socket-carrying part;

Fig. 3 is a transverse sectional view as taken on the line 3—3 of Fig. 2 but showing the rivet as being integral with the attaching device;

Fig. 4 is a detail perspective view of one of the socket member attaching means shown in Fig. 1;

Fig. 5 is a sectional view, similar to Fig. 3, illustrating a modified form of the invention; and Fig. 6 is a detail perspective view of the socket member attaching means illustrated in Fig. 5.

Referring to the drawing, the fastener installation to which my invention relates preferably is of the type comprising a rotary stud member 10, formed with a head 11 and radial arms 12, and rotatably mounted in any suitable manner in an aperture 13 of a part 14 adapted to be secured to a support 15. The support 15 conveniently is apertured as at 16 for the passage of the stud 10 and arms 12 and has mounted thereon a socket member 17 adapted for locking engagement with the arms 12 of the stud on turning movements of the latter.

The socket member 17 may be of any of the approved types, the one shown herein being selected merely for the purpose of illustration. Conveniently it comprises a base 18 providing spaced bearing portions 19 adapted to bear upon the support 15, said base being formed with an outwardly dished portion apertured as at 20 to permit the passage of the stud 10 and radial arms 12 and providing a cam seat 21 for interlocking engagement with the arms 12 of the stud. Portion 22 integrally connected with the base 18 on opposite sides of the aperture may be bent upwardly and inwardly to provide locking means 23 adapted to overlie the radial arms 12 of the stud in its rotated locked position as will be understood by those skilled in the art. The particular form of socket member illustrated herein is not an essential feature of the invention and reference is made to the co-pending application of William A. Bedford, Jr., Serial No. 420,554, filed November 26, 1941, for a more complete description thereof.

The support 15 carrying the socket member 17 is of non-metallic material, such as plywood, fiber board and the like, and the invention provides improved means for attaching said socket part to a sheet of such material.

According to the form of invention illustrated in Figs. 1, 2 and 3, the bearing portions 19 of the base of the socket member are formed with an aperture 25 through which may pass a rivet 25ª for securing the attaching member to the socket member.

The attaching member is advantageously formed with a plate portion 26 apertured as at 27 to receive said rivet 25ª and bearing upon the bearing portions 19. The outer peripheral edge of the attaching plate is formed with a series of integral prongs 28 extending at right angles thereto. These prongs are formed with pointed outwardly curved free ends 29 which are capable of being forced straight through the material of the support 15 by pressure applied to the outer face of the plate.

In applying the pressure on the attaching plate 26 to force the prongs 28 through the support 15, a metal backing plate (not shown) is usually applied against the opposite face of the support. When the outwardly curved pointed ends 29 of the prongs 28 strike the plate, they are curled outwardly, as continuing pressure is applied to the plate portion 26, so that they are well clenched and lie wholly embedded in the relatively soft material of the support 15. This provides a secure and effective mounting for the socket member and attaching plate which will not pull out of the relatively soft material even when subjected to unduly heavy stress.

It will be understood that the tubular rivet 25ª is flattened over the outer face of the attaching plate in any suitable manner to fixedly connect the attaching plate to the bearing portions of the socket member.

According to a modified form of the invention, as is illustrated in Figs. 5 and 6, the attaching plate 26 may underlie and support the bearing portions 19 of the socket 17, thus providing a rigid bearing surface for the socket bearing portion and to a great extent avoiding the difficulty of having the socket member materially embedded in the material of the part 15. According to this form, and the form shown in Fig. 3, the attaching plate may be provided with the integral tubular rivet 25ᵇ which extends through an aperture 25 in the bearing portion 19 and is then flattened over the bearing portion in a conventional manner, as illustrated in the drawing.

While I have illustrated and described preferred embodiments of my invention, I do not wish to be limited thereby, because the scope of my invention is best defined by the following claims.

I claim:

1. In combination with a non-metallic support, a separable fastener member adapted to be attached to one face thereof and including a base having spaced bearing portions and an attaching cap having integral fastening means adapted to be connected to each of said bearing portions for securing said socket member to said support, said fastening means extending through said support.

2. In combination with a non-metallic support, a separable fastener member adapted to be attached to one face thereof and including a base having spaced bearing portions and an attaching cap having integral peripheral prongs, a rivet connection between said cap and bearing portions, said prongs extending through said support and clenched therein.

3. In combination with a non-metallic support, a heat-treated fastener socket member adapted to be attached to one face thereof and including a base having spaced bearing portions, and an attaching cap having integral peripheral bendable prongs, a rivet connection between said cap and bearing portions, said prongs extending through said support and clenched therein.

4. In combination with a plywood support, a two-part fastener member for attachment to said support and comprising a base portion and an attaching portion, one of said parts being formed with an integral rivet engaging in an aperture of the other part, and said attaching portion having a plurality of prongs, said prongs extending through said support and clenched therein.

5. In combination with a plywood support, a two-part fastener socket member for attachment to said support and comprising a heat-treated base portion and an attaching portion, one of said parts being formed with an integral rivet engaging in an aperture of the other part, and said attaching portion having a plurality of bendable peripheral prongs, said prongs extending through said support and clenched therein.

6. In combination with a plywood support, a two-part fastener socket member for attachment to said support and comprising a base portion and an attaching portion, said base portion being formed with an integral rivet engaging in an aperture in said attaching portion, and said attaching portion having a plurality of peripheral prongs, said prongs extending through said support and clenched therein.

7. In combination with a plywood support, a two-part fastener socket member for attachment to said support and comprising a base portion and an attaching portion, said attaching portion having an integral rivet engaging in an aperture in said base portion, and said attaching portion having a plurality of peripheral prongs, said prongs extending through said support and clenched therein.

8. In combination with a plywood support, a two-part fastener socket member for attachment to said support and comprising a base portion and an attaching portion underlying and supporting said base portion, and said attaching portion having a plurality of peripheral prongs, said prongs extending through said support and clenched therein.

THOMAS NEWBOLD.